(12) United States Patent
Wang

(10) Patent No.: US 10,089,749 B2
(45) Date of Patent: Oct. 2, 2018

(54) METHOD AND SYSTEM FOR LOCATING A PLURALITY OF TARGETS#

(71) Applicant: Beijing Pico Technology Co., Ltd., Beijing (CN)

(72) Inventor: Zhenjie Wang, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 21 days.

(21) Appl. No.: 15/362,056

(22) Filed: Nov. 28, 2016

(65) Prior Publication Data

US 2017/0345174 A1    Nov. 30, 2017

(30) Foreign Application Priority Data

May 27, 2016  (CN) .......................... 2016 1 0365406

(51) Int. Cl.
*G06T 7/557* (2017.01)
*G06T 7/571* (2017.01)
(Continued)

(52) U.S. Cl.
CPC ............. *G06T 7/557* (2017.01); *G06T 7/571* (2017.01); *H04N 5/2256* (2013.01); *H04N 5/33* (2013.01);
(Continued)

(58) Field of Classification Search
CPC . G06T 7/557; G06T 7/571; G06T 7/70; G06F 3/011; H04N 5/2256; H04N 5/33; H04N 5/332; A63F 13/525
See application file for complete search history.

(56) References Cited

U.S. PATENT DOCUMENTS 6,801,637 B2 *  10/2004  Voronka ................. G06T 7/246
                                                        348/169
6,813,593 B1 *  11/2004  Berger .................. F41G 3/2677
                                                        434/12
(Continued)

FOREIGN PATENT DOCUMENTS

CN          103020983 A      4/2013
CN          103135801 A      6/2013
(Continued)

OTHER PUBLICATIONS

Ryu et al. "RF Signal Synchronized Low Cost Motion Capture Device." Asia-Pacific Microwave Conference, Dec. 11, 2007, 4 pages.*

*Primary Examiner* — Jon Chang
(74) *Attorney, Agent, or Firm* — Leydig, Voit & Mayer, Ltd.

(57) ABSTRACT

A method and system for locating a plurality of targets are provided, wherein all targets to be located move within a spatial area. The method comprises: providing an infrared light source on each of the targets to be located; according to a preset sampling frequency, controlling the infrared light source on each of the targets to be located to be turned on and off sequentially; according to the preset sampling frequency, obtaining infrared gray scale images of the space where the targets to be located are located; and locating one target to be located in each of the obtained infrared gray scale images. By the infrared light source locating, ambient interference is highly avoided, and the accuracy of the locating is improved. By controlling the infrared light sources to be turned on and off sequentially, there is only one infrared light source being turned on in each of the obtained infrared gray scale images, by which the targets to be located are easily distinguished, and the image processing on the (Continued)

basis of gray scale can reduce the data volume to be transmitted and increase the processing speed to a large extent.

9 Claims, 2 Drawing Sheets

(51) Int. Cl.
    *H04N 5/225*     (2006.01)
    *H04N 5/33*     (2006.01)
    *G06T 7/70*     (2017.01)
    *A63F 13/525*     (2014.01)

(52) U.S. Cl.
    CPC ............ *H04N 5/332* (2013.01); *A63F 13/525* (2014.09); *G06T 7/70* (2017.01)

(56) References Cited

U.S. PATENT DOCUMENTS

| | | | |
|---|---|---|---|
| 2009/0081619 A1* | 3/2009 | Miasnik | F41A 33/02 434/21 |
| 2013/0267318 A1 | 10/2013 | Pryor et al. | |
| 2015/0280818 A1* | 10/2015 | Walma | H04B 10/116 398/118 |
| 2016/0140930 A1* | 5/2016 | Pusch | G06F 3/011 345/633 |
| 2017/0177939 A1* | 6/2017 | Beall | G06K 9/00671 |

FOREIGN PATENT DOCUMENTS

| CN | 103657089 A | 3/2014 |
|---|---|---|
| CN | 204808201 U | 11/2015 |

* cited by examiner

METHOD AND SYSTEM FOR LOCATING A PLURALITY OF TARGETS#

CROSS-REFERENCE TO RELATED APPLICATION

This application claims the benefit and priority of Chinese Patent Application No. 201610365406.9 filed May 27, 2016. The entire disclosure of the above application is incorporated herein by reference.

TECHNICAL FIELD

The present disclosure relates to the technical field of target locating, and particularly to a method and system for locating a plurality of targets.

BACKGROUND

In some application scenes, it is needed to position a plurality of targets moving in a spatial area. For example in the course of virtual reality experiencing, the user needs to interact with the virtual reality environment. The usual mode is that the user's two hands individually hold one handle light ball, and the actions of the user's hands are tracked by locating the light balls, by which the interaction with the virtual reality environment is realized. Currently, generally targets to be located are tracked and located by employing RGB light sources in combination with infrared light sources, wherein the infrared light sources are used to determine the positions of the targets, and the RGB light sources can be used to distinguish the targets by combining RGB components to give different colors.

In that locating mode, when images are being obtained, each camera needs two CMOSs to individually acquire an infrared image and a color image, which increases the production cost of the camera. Furthermore, it is generally needed to rectify and configure in advance the combined colors of the targets to be located, only by which the targets may be precisely distinguished according to the H of the HSV (Hue, Saturation and Value) components. However, both the power supply voltage of the RGB light sources and the environmental background colors affect the accuracy of the locating.

SUMMARY OF THE DISCLOSURE

In order to solve the problem that the conventional mode of locating a plurality of targets by employing RGB light sources in combination with infrared light sources is susceptible to the interference of environmental background colors, improve the accuracy of the locating, and reduce hardware cost, the present disclosure provides a method and system for locating a plurality of targets.

According to one aspect of the present disclosure, the present disclosure provides a method of locating a plurality of targets, wherein all targets to be located move within a spatial area, the method comprising:

providing an infrared light source on each of the targets to be located;

controlling the infrared light source on each of the targets to be located to be turned on and off sequentially according to a preset sampling frequency;

obtaining infrared gray scale images of the space where the targets to be located are located according to the preset sampling frequency; and locating one target to be located in each of the obtained infrared gray scale images.

Preferably, the controlling the infrared light source on each of the targets to be located to be turned on and off sequentially according to the preset sampling frequency comprises:

transmitting a periodical power supplying signal to the infrared light source provided on each of the targets to be located, wherein each period of the power supplying signal is divided into several time intervals of equal lengths, wherein the number of the time intervals is equal to the number of the targets to be located; and numbering each of the targets to be located, and in each of the time intervals of each period of the power supplying signal, according to the preset sampling frequency, controlling sequentially the infrared light sources on the targets to be located of a corresponding numbers to be in a turned-on state, and the infrared light sources on the other targets to be located to be in a turned-off state.

Preferably, the obtaining infrared gray scale images of the space where the targets to be located are located according to the preset sampling frequency comprises:

in each of the time intervals of each period of the power supplying signal, according to the preset sampling frequency, obtaining one infrared gray scale image of the space where the targets to be located are located.

Preferably, the method is applied to locating handle light balls of a virtual reality system.

According to another aspect of the present disclosure, the present disclosure provides a system for locating a plurality of targets, wherein all targets to be located move within a spatial area, the system comprising infrared light sources provided respectively on the targets to be located, a processor and a memory, the processor execute instructions stored in the memory, the instructions comprise a turned-on/off controlling instruction, an image obtaining instruction and a locating instruction;

the turned-on/off controlling instruction is configured to, according to a preset sampling frequency, control the infrared light source on each of the targets to be located to be turned on and off sequentially;

the image obtaining instruction is configured to, according to the preset sampling frequency, obtain infrared gray scale images of the space where the targets to be located are located; and the locating instruction is configured to position one target to be located in each of the obtained infrared gray scale images.

Preferably, the turned-on/off controlling instruction is configured to:

transmit a periodical power supplying signal to the infrared light source provided on each of the targets to be located, wherein each period of the power supplying signal is divided into several time intervals of equal lengths, wherein the number of the time intervals is equal to the number of the targets to be located; and number each of the targets to be located, and in each of the time intervals of each period of the power supplying signal, and according to the preset sampling frequency, control sequentially the infrared light sources on the targets to be located of a corresponding numbers to be in a turned-on state, and the infrared light sources on the other targets to be located to be in a turned-off state.

Preferably, the image obtaining instruction is configured to: in each of the time intervals of each period of the power supplying signal, according to the preset sampling frequency, obtain one infrared gray scale image of the space where the targets to be located are located.

Preferably, the system is applied to locating handle light balls of a virtual reality system.

The advantageous effects of the embodiments of the present disclosure are as follows: by the infrared light source locating, ambient interference is highly avoided, and the accuracy of the locating is improved. The present disclosure does not need to provide RGB light sources on the targets to be located, and does not need to obtain color images, which reduces the hardware cost. By controlling the infrared light sources to be turned on and off sequentially, there is only one infrared light source in each of the obtained infrared gray scale images, by which the targets to be located are easily distinguished, and the image processing on the basis of gray scale can reduce the data volume to be transmitted and increase the processing speed to a large extent.

DETAILED DESCRIPTION

The design idea of the present disclosure is as follows: providing infrared light sources on the targets to be located, and turning on and off sequentially of the infrared light sources to realize the locating of the targets to be located. Compared with locating by employing RGB light sources in combination with infrared light sources, the present disclosure can reduce hardware cost, improve the accuracy of the locating, reduce the sampling data volume of images, and increase the operational speed to a large extent.

The embodiments of the present disclosure will be described below in further detail in conjunction with figures to make the objectives, technical solutions and advantages of the present disclosure clearer.

Figure 1:
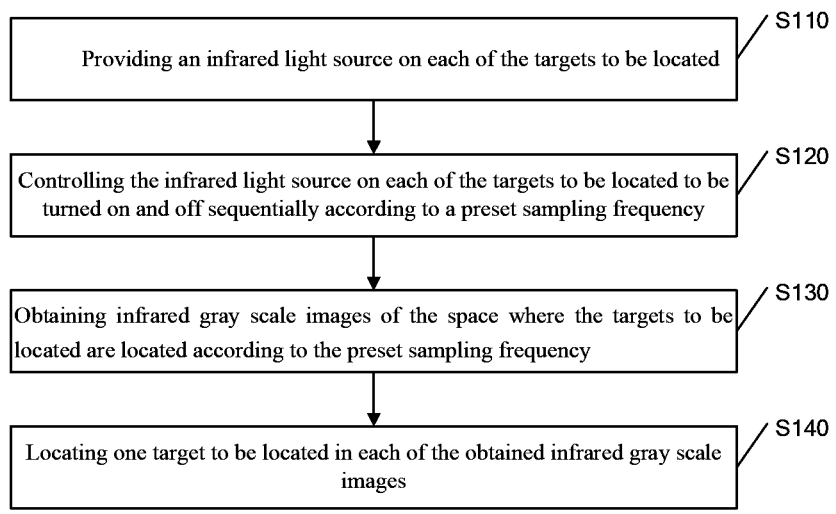
FIG. 1 is the flow chart of a method of locating a plurality of targets provided by an embodiment of the present disclosure.

FIG. 1 is the flow chart of a method of locating a plurality of targets provided by an embodiment of the present disclosure. As shown in FIG. 1, the method of locating a plurality of targets provided by an embodiment of the present disclosure comprises:

Step S110: providing an infrared light source on each of the targets to be located.

Step S120: controlling the infrared light source on each of the targets to be located to be turned on and off sequentially according to a preset sampling frequency.

Step S130: obtaining infrared gray scale images of the space where the targets to be located are located according to the preset sampling frequency; and Step S140: locating one target to be located in each of the obtained infrared gray scale images.

If visible light sources are provided on the targets to be located and the targets to be located are to be distinguished by the colors of the visible light sources, there may be interfering substances of the similar colors with the visible light sources in the circumstance, which results in locating errors. Therefore, the locating method provided by the present disclosure provides an infrared light source on each of the targets to be located, and images are obtained by apparatus like an infrared camera. Because the infrared camera itself shields most of the information of visible light, the infrared light sources will be especially obvious in the obtained images, and unless there is interference from other infrared light sources in the circumstance, misjudgment is scarcely possible, which improves the accuracy of the locating.

By the infrared light sources provided on the targets to be located the positions of the targets to be located can be determined; however, when a plurality of targets to be located are moving in the same spatial area, there will be a plurality of targets to be located in one image obtained from the space, so the targets need to be distinguished. In an embodiment of the present disclosure, a sampling frequency is preset, and the apparatus like an infrared camera obtains the images of the overall space according to the frequency. The infrared light source on each of the targets to be located is controlled to be turned on and off sequentially, so that at one time only one infrared light source is in a turned-on state, and in each of the images obtained by the apparatus like an infrared camera according to the sampling frequency there is only one infrared light source being turned on, by which the distinguishing between each of the targets to be located is realized. The whole locating process utilizes only infrared light sources, does not need to provide RGB light sources on the targets to be located, and does not need to obtain color images, which reduces the hardware cost.

In an preferred embodiment of the present disclosure, the "controlling the infrared light source on each of the targets to be located to be turned on and off sequentially" in Step S120 comprises: transmitting a periodical power supplying signal to the infrared light source provided on each of the targets to be located, wherein when the power supplying signal is at a high electric level, the infrared light source is in a turned-on state, and when the power supplying signal is at a low electric level, the infrared light source is in a turned-off state. Each period of the power supplying signal is divided into several time intervals of equal lengths according to the number of the targets to be located. For an infrared light source, only one time interval in one period of the power supplying signal is at a high electric level, and the other time intervals are all at a low electric level, and the high electric level of the power supplying signal of each of the infrared light sources is at a different time interval, which ensures that in one period, there is only one infrared light source being in the turned-on state.

The targets to be located may be numbered, so that the infrared light sources on the targets to be located of the number n is turned on at the nth time interval of each period of the power supplying signal. The frequency of the apparatus like an infrared camera obtaining the images is controlled to be synchronized with the power supplying signal; that is, to, in each of the time intervals of each period of the power supplying signal, obtain one infrared gray scale image of the space where the targets to be located are located.

Figure 2:
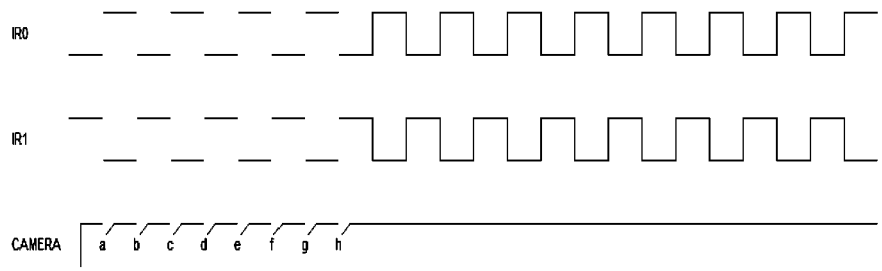
FIG. 2 is the schematic representation of a periodical power supplying signal of an infrared light source provided by an embodiment of the present disclosure.
Figures 3A, 3B:
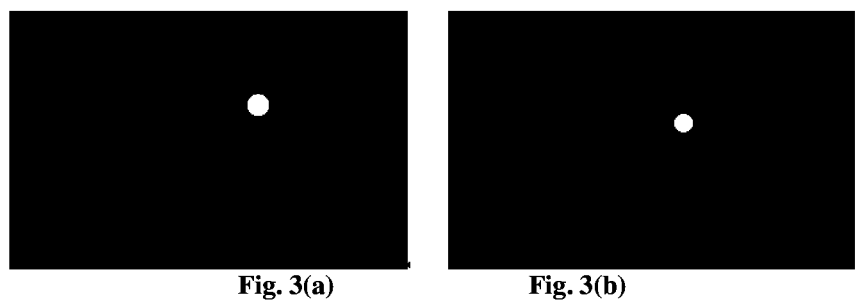
FIG. 3(a) and FIG. 3(b) are the outcome view of locating one target to be located from each of the obtained infrared gray scale images provided by an embodiment of the present disclosure.

FIG. 2 is the schematic representation of a periodical power supplying signal of an infrared light source in a method of locating a plurality of targets provided by an embodiment of the present disclosure. As shown in FIG. 2, the method of locating a plurality of targets provided by a preferred embodiment of the present disclosure is applied to locating handle light balls of a virtual reality system. In a virtual reality system, generally the user's two hands need to be tracked. The user holds two handle light balls A and B respectively in his left hand and right hand as the targets to be located, and the handle light balls are individually provided with an infrared light source. In FIG. 2 IR0 is the power supplying signal of the infrared light source provided on the handle light ball A, and IR1 is the power supplying signal of the infrared light source provided on the handle light ball B, wherein at a high electric level the infrared light sources are turned on, and at a low electric level the infrared light sources are turned off. CAMERA is the sampling frequency of the camera, and the sampling is performed twice in one period of a power supplying signal, by which the handle light ball A and the handle light ball B are individually located. FIG. 3(a) and FIG. 3(b) are the outcome view of locating one target to be located in each of the obtained infrared gray scale images provided by an embodiment of the present disclosure. For example, the white dot in FIG. 3(a) is the position of the handle light ball A, and the white dot in FIG. 3(b) is the position of the handle light ball B.

Because in the image processing the locating is on the basis of a gray scale image, assuming that each pixel is represented by an 8-bit integer and the sampling is performed twice in one period, each pixel needs 16 bits of data volume to be transmitted. If a locating mode of RBG light sources in combination with infrared light sources is employed, the data to be transmitted is gray scale data and RGB data, which have the data volume of 32 bits. Therefore, the data volume to be transmitted of the method of locating a plurality of targets provided by the present disclosure are reduce by 50%, which can greatly accelerate the processing and locating of images.

Figure 4:
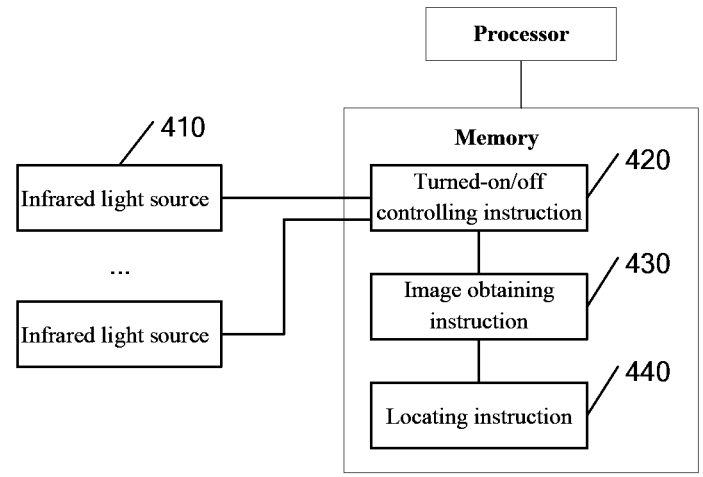
FIG. 4 is the structural schematic representation of a system for locating a plurality of targets provided by an embodiment of the present disclosure.

FIG. 4 is the structural schematic representation of a system for locating a plurality of targets provided by an embodiment of the present disclosure. As shown in FIG. 4, the system for locating a plurality of targets provided by the present disclosure comprises infrared light sources 410 provided respectively on the targets to be located, a processor and a memory, the processor execute instructions stored in the memory, the instructions comprise a turned-on/off controlling instruction 420, an image obtaining instruction 430 and a locating instruction 440, wherein all targets to be located move within a spatial area. The turned-on/off controlling instruction 420 is configured to, according to a preset sampling frequency, control the infrared light source 410 on each of the targets to be located to be turned on and off sequentially, the image obtaining instruction 430 is configured to, according to the preset sampling frequency, obtain infrared gray scale images of the space where the targets to be located are located, and the locating instruction is configured to position one target to be located in each of the obtained infrared gray scale images.

In a preferred embodiment, the turned-on/off controlling instruction 420 is configured to: transmit a periodical power supplying signal to the infrared light source 410 provided on each of the targets to be located, wherein each period of the power supplying signal is divided into several time intervals of equal lengths, wherein the number of the time intervals is equal to the number of the targets to be located, and number each of the targets to be located, and in each of the time intervals of each period of the power supplying signal, control sequentially the infrared light sources on the targets to be located of a corresponding numbers to be in a turned-on state, and the infrared light sources on the other targets to be located to be in a turned-off state. More preferably, the image obtaining instruction 420 is configured to, in each of the time intervals of each period of the power supplying signal, obtain one infrared gray scale image, wherein each of the images of one period individually contains a different target to be located.

The system for locating a plurality of targets provided by an embodiment of the present disclosure may be applied to locating handle light balls of a virtual reality system. The user's left hand and right hand individually holds a handle light ball, and takes the two light balls as the targets to be located. The actions of the user's hands are tracked by locating the two light balls, by which the interaction with the virtual reality environment is realized. Compared with locating by employing RGB light sources in combination with infrared light sources, the system for locating a plurality of targets provided by the present disclosure employs infrared light sources, by which ambient interference is highly avoided. It does not need to provide RGB light sources on the targets to be located, and does not need to obtain color images, which reduces the hardware cost. Further, the image processing is on the basis of gray scale, and thereby there is no need to obtain and transmit RGB data, by which the data volume to be transmitted is reduced and the processing speed can be increased.

To conclude, the method and system for locating a plurality of targets provided by the present disclosure, compared with the prior art, have the following advantageous effects:

1. By the infrared light source locating, ambient interference is highly avoided, which improves the accuracy of the locating. It does not need to provide RGB light sources on the targets to be located, and does not need to obtain color images, which reduces the hardware cost.

2. By controlling the infrared light sources to be turned on and off sequentially, there is only one infrared light source being turned on in each of the obtained infrared gray scale images, by which the targets to be located are easily distinguished, and the image processing on the basis of gray scale can reduce the data volume to be transmitted and can increase the processing speed to a large extent.

What are described above are only preferred embodiments of the present disclosure and not intended to limit the protection scope of the present disclosure. Any modifications, equivalent substitutions and improvements made within the spirit and principle of the present disclosure are all included in the protection scope of the present disclosure.

It should be explained that:

The embodiments of the components of the present disclosure can be implemented as hardware, as a software module executed on one or more processors, or as their combination. A person skilled in the art should understand that, microprocessors or digital signal processors (DSP) can be employed in practice to implement some or all of the functions of some or all of the components according to the embodiments of the present disclosure. The present disclosure can also be implemented as devices or device programs for executing some or all of the method described herein (for example, computer programs and computer program products). Such programs for implementing the present disclosure can be stored in computer readable media, or can be in the form of one or more signals. Such signals can be obtained by being downloaded from internet websites, or be provided by carrier signals, or be provided in any other forms.

The system for locating a plurality of targets of the present disclosure traditionally comprises a processor and a computer program product or a computer readable medium in the form of memory. The memory can be an electronic memory such as a flash memory, an EEPROM, an EPROM, a hard disk or a ROM and the like. The memory has a storage space for executing the program code of any method step of the above method. For example, the storage space for the program code can comprise each of the program codes for individually implementing the steps of the above method. These program codes can be read out or written in from one or more computer program products to the one or more computer program products. The computer program products comprise program code carriers such as hard disk, compact disk (CD), memory card or floppy disk and the like. Such computer program products are generally portable or fixed storage units. The storage units can be similarly disposed memory segments, storage spaces or the like. The program code can for example be compressed in appropriate forms. Generally, the storage units comprise computer readable codes for executing the method steps according to the present disclosure, that is, codes that can be read by for example processors, and when the codes are executed, the system for locating a plurality of targets executes each of the steps of the method described above.

It should be noted that, the above embodiments are intended to illustrate the present disclosure, rather than limiting the present disclosure, and a person skilled in the art can design alternative embodiments without departing from the scope of the attached claims. The word "comprise" does not exclude the elements or steps that are not listed in the claims. The present disclosure can be implemented by means of hardware that comprise numbers of different elements and by means of computers that are properly programmed. In claims that list numbers of units of devices, some of these devices can be embodied via the same hardware item.

The description provided herein illustrates many concrete details. However, it can be understood that, the embodiments of the present disclosure can be implemented without the concrete details. In some embodiments, well known methods, structures and techniques are not described in detail, so as not to obscure the understanding of the description. The languages used in the description are chosen mainly for sake of readability and teaching, and are not chosen to interpret or define the subject matter of the present disclosure.

The invention claimed is:

1. A method of locating a plurality of targets, wherein all targets to be located move within a spatial area, the method comprises:
providing an infrared light source on each of the targets to be located;
controlling the infrared light source on each of the targets to be located to be turned on and off sequentially according to a preset sampling frequency, including:
transmitting a periodical power supplying signal to the infrared light source provided on each of the targets to be located, wherein each period of the power supplying signal is divided into several time intervals of equal lengths, wherein the number of the time intervals is equal to the number of the targets to be located; and
numbering each of the targets to be located, and in each of the time intervals of each period of the power supplying signal, according to the preset sampling frequency, controlling sequentially the infrared light sources on the targets to be located of corresponding numbers to be in a turned-on state, and controlling sequentially the infrared light sources on other targets to be located to be in a turned-off state;
obtaining infrared gray scale images of space where the targets to be located are located according to the preset sampling frequency; and
locating one target to be located in each of the obtained infrared gray scale images.

2. The method of locating a plurality of targets according to claim 1, wherein the obtaining infrared gray scale images of the space where the targets to be located are located according to the preset sampling frequency comprises:
in each of the time intervals of each period of the power supplying signal, according to the preset sampling frequency, obtaining one infrared gray scale image of the space where the targets to be located are located.

3. The method of locating a plurality of targets according to claim 2, wherein the method is applied to locating handle light balls of a virtual reality system.

4. A system for locating a plurality of targets, wherein all targets to be located move within a spatial area, the system comprises infrared light sources provided respectively on the targets to be located, a processor and a memory, the processor execute instructions stored in the memory, the instructions comprise a turned-on/off controlling instruction, an image obtaining instruction and a locating instruction;
the turned-on/off controlling instruction is configured to, according to a preset sampling frequency, control the infrared light source on each of the targets to be located to be turned on and off sequentially, including:
transmitting a periodical power supplying signal to the infrared light source provided on each of the targets to be located, wherein each period of the power supplying signal is divided into several time intervals of equal lengths, wherein the number of the time intervals is equal to the number of the targets to be located; and
numbering each of the targets to be located, and in each of the time intervals of each period of the power supplying signal, according to the preset sampling frequency, controlling sequentially the infrared light sources on the targets to be located of corresponding numbers to be in a turned-on state, and controlling sequentially the infrared light sources on other targets to be located to be in a turned-off state;
the image obtaining instruction is configured to, according to the preset sampling frequency, obtain infrared gray scale images of space where the targets to be located are located; and
the locating instruction is configured to locate one target to be located in each of the obtained infrared gray scale images.

5. The system for locating a plurality of targets according to claim 4, wherein the image obtaining instruction is configured to: in each of the time intervals of each period of the power supplying signal, according to the preset sampling frequency, obtain one infrared gray scale image of the space where the targets to be located are located.

6. The system for locating a plurality of targets according to claim 5, wherein the system is applied to the locating of handle light balls of a virtual reality system.

7. A non-transitory computer readable medium, comprising processor-executable instructions stored thereon, which when executed by a processor, cause the processor to implement operations of locating a plurality of targets, wherein all targets to be located move within a spatial area, the operations including:

providing an infrared light source on each of the targets to be located;

controlling the infrared light source on each of the targets to be located to be turned on and off sequentially according to a preset sampling frequency, including:

transmitting a periodical power supplying signal to the infrared light source provided on each of the targets to be located, wherein each period of the power supplying signal is divided into several time intervals of equal lengths, wherein the number of the time intervals is equal to the number of the targets to be located; and numbering each of the targets to be located, and in each of the time intervals of each period of the power supplying signal, according to the preset sampling frequency, controlling sequentially the infrared light sources on the targets to be located of a corresponding numbers to be in a turned-on state, and the infrared light sources on the other targets to be located to be in a turned-off state;

obtaining infrared gray scale images of space where the targets to be located are located according to the preset sampling frequency; and locating one target to be located in each of the obtained infrared gray scale images.

8. The non-transitory computer readable medium according to claim 7, wherein the operation of obtaining infrared gray scale images of the space where the targets to be located are located according to the preset sampling frequency further includes:

in each of the time intervals of each period of the power supplying signal, according to the preset sampling frequency, obtaining one infrared gray scale image of the space where the targets to be located are located.

9. The non-transitory computer readable medium according to claim 8, wherein the operations are applied to locating handle light balls of a virtual reality system.

* * * * *